United States Patent [19]

Maehara et al.

[11] 4,247,346
[45] Jan. 27, 1981

[54] FRICTION WELDING APPARATUS

[75] Inventors: Kazuo Maehara; Isao Sato, both of Yokohama, Japan

[73] Assignee: Asahi Kasei Kogyo Kabushiki Kaisha, Osaka, Japan

[21] Appl. No.: 905,018

[22] Filed: May 11, 1978

[30] Foreign Application Priority Data

May 12, 1977 [JP] Japan .................... 52/54606

[51] Int. Cl.³ .................. B29C 27/08; B06B 1/16; B32B 31/20
[52] U.S. Cl. .................... 156/73.5; 29/505; 29/514; 72/74; 72/112; 156/157; 156/502; 156/580; 156/582; 228/2; 228/29; 228/113
[58] Field of Search ............ 29/505, 514; 72/69, 72/74, 112; 156/73.5, 580, 502, 157, 582; 228/2, 29, 113

[56] References Cited

U.S. PATENT DOCUMENTS

| | | | |
|---|---|---|---|
| 3,062,695 | 11/1962 | Hull | 156/73.5 |
| 3,554,845 | 1/1971 | Billett et al. | 156/580 |
| 3,554,846 | 1/1971 | Billett | 156/73.5 X |
| 3,732,613 | 5/1973 | Steigerwald | 156/73.5 X |

Primary Examiner—John T. Goolkasian
Assistant Examiner—Robert A. Dawson
Attorney, Agent, or Firm—Armstrong, Nikaido, Marmelstein & Kubovcik

[57] ABSTRACT

A friction welding apparatus for welding a pair of members in which the welding surfaces of the members are contacted under pressure with each other, relative circular orbit motion of the members producing friction therebetween thereby heating and melting the welding surfaces and the relative circular orbit motion being stopped to locate the welding surfaces in a predetermined position. The apparatus comprises an eccentric device including a rotary driving shaft, an inertia member disposed around the periphery of the rotary driving shaft, the inertia member being rotated by the rotary driving shaft and being capable of subjecting an angular movement relative thereto and an eccentric shaft rotated by the rotary driving shaft and engaged with the inertia member so as to be moved by the relative angular movement of the inertia member relative to the rotary driving shaft between a co-axial position with the axis of the rotary driving shaft and an eccentric position spaced by a predetermined distance apart therefrom, a movable table engaged through a bearing with the eccentric shaft for supporting the member to be welded, the movable table being connected by a motion restricting device to a fixed frame to be capable of causing substantial relative circular orbit motion in a plane perpendicular to the axis of the rotary driving shaft, the inertia member being angularly moved by rapid increase in the speed of the rotary driving shaft relative thereto from a first position to a second position such that the eccentric shaft is moved from the co-axial position to the eccentric position and the movable table is put in the relative circular orbit motion, and the inertia member being returned by rapid stoppage of the rotary driving shaft from the second position to the first position such that the eccentric shaft is returned to the co-axial position and the movable table is stopped at the predetermined position.

21 Claims, 23 Drawing Figures

FRICTION WELDING APPARATUS

This invention relates to a friction welding apparatus for welding surfaces of a pair of members to be welded by making a relative circular orbit motion to weld them by friction.

The substantially circular orbit motion referred to herein not only means a revolutional motion of a member along a circular orbit excluding its own rotation, but also includes a similar motion, such as an elliptic orbit motion, or a motion including any vibrating component resulting from the machine.

Friction welding methods have been widely known for welding metallic or thermoplastic material with extremely high welding strengths. In such methods, a friction welding method utilizing a high speed vibratory motion along a relatively small circular orbit (circular orbit motion) not causing any rotation is technically very useful, because it makes it possible to weld a material of non-circular and non-rotatable configuration, such as a rectangular configuration.

In such a circular orbit motion type friction welding apparatus, the welding surfaces of a pair of members to be welded are contacted with each other in a desired position, and at least one of the members is moved under pressure relative to the other member along a circular orbit in parallel with the welding surfaces. When the layers adjacent to the welding surfaces of the members to be welded have been sufficiently melted by frictional heat, the radius of the circular orbit motion is reduced to zero with the pressure maintained or increased, to return the members to the desired position. Then the members are cooled and solidified to produce a welded body. Such a friction welding apparatus is described in, for example, U.S. Pat. No. 3,732,613 in which during the friction welding process an adjustable rod of the apparatus is driven by an exterior controller and a servo-motor to vary the radius of the circular orbit motion. However, this system can not control the radius over an intended length at any time, and requires a complicated mechanism.

Furthermore, a circular orbit motion type friction welding apparatus for welding a plastic strap is disclosed in U.S. Pat. No. 3,554,846. This apparatus comprises a driving shaft connected to a motor, a sleeve having an inner periphery eccentrically formed in respect of its outer periphery, an articulated element for connecting the shaft and a sleeve for causing them to move relative to each other and a weight connected to one end of the articulated element. At the initiation of the friction welding operation, when the motor is accelerated the sleeve is articulatingly moved relative to the driving shaft by the centrifugal force caused by the weight. In contrast, when the motor is stopped after the plastic strap has melted in part, the weight acts to return the sleeve to the initial position relative to the shaft. This apparatus has a very simple construction and is suitable for welding the plastic strap, but is not useful where a relatively large driving force is required, for example, in case of welding of a metallic member or molded plastics.

It is an object of the present invention to provide an improved circular orbit motion type friction welding apparatus.

It is another object of the present invention to provide a circular orbit motion type friction welding apparatus suitable for welding metallic members and rigid plastic goods.

It is a further object of the present invention to provide a circular orbit motion type friction welding apparatus having a simple mechanism for obtaining a high welding strength.

It is a still further object of the present invention to provide a friction welding method using the above-described apparatus.

Other objects of the present invention will be apparent by way of the following description and the accompanying drawings.

The apparatus of the present invention includes a particular eccentric means which is provided with a rotary driving shaft driven by a motor. Provided on the rotary driving shaft rotatably relative thereto is an eccentric shaft which is permitted to assume either of two positions in accordance with rapid acceleration or rapid stoppage of the rotary driving shaft. The first position is a position co-axial with the axis of the rotary driving shaft (hereinbelow referred to as central position), and the second position is a position spaced a determined distance apart from the central position (hereinbelow referred to as eccentric position).

Provided through a bearing on the eccentric shaft is a movable table for supporting one of the members to be welded. Furthermore, the movable table is engaged with a fixed frame or base plate through a motion restricting means described later, thereby enabling the movable table to move along the circular orbit in a plane perpendicular to the axis of the rotary driving shaft.

The eccentric shaft is rotated by rotation of the rotary driving shaft, and when the latter is rapidly accelerated the eccentric shaft is moved from the first position to the second and thus the movable table is changed from the stationary condition in the desired registering position to the circular orbit moving condition with a determined radius. The eccentric shaft is returned by the rapid stoppage (rapid deceleration) of the rotary driving shaft from the second position to the first position and thus the movable table is retained in the registering position. In the present invention, such movement by the eccentric shaft is made by the rotation of the rotary driving shaft itself or by the centrifugal force resulting from the acceleration or deceleration of the rotation or by the inertia force due to the acceleration, and a particular construction of inertia member is further used.

The force required for moving the eccentric shaft when accelerating the rotation of the rotary driving shaft is generally explained as follows.

When the eccentric shaft is moved from the central position to the eccentric position, a force overcoming the frictional force generating between the pair of members to be welded is applied to the eccentric shaft, and as the latter moves away from the central position the centrifugal force caused by the circular orbit motion of the movable table promotes such movement of the eccentric shaft and thus the external force required becomes reduced. When the eccentric shaft is moved from the eccentric position to the central position an external force overcoming the resultant force of said frictional force plus the centrifugal force acting on the movable table is applied.

The centrifugal force utilized in the present invention is caused in accordance with the speed and radius of rotation, but is always directed in a direction away from the axis of rotation. On the other hand, the inertia force due to the changes in the speed at the acceleration or deceleration of the rotation is directed in either of the opposite directions in accordance with the acceleration or deceleration.

Accordingly, in case of utilizing the centrifugal force, this force can only contribute to one directional operation, and it is, therefore, impossible that by only using the centrifugal force the eccentric shaft performs the two directional movements, that is the movement from the central position to the eccentric position as well as the movement from the eccentric position to the central position. If the centrifugal force is utilized for either of the directional movements, it acts to obstruct the opposite directional movement, and thus the utilization of the centrifugal force alone can not be made.

It may, however, be possible that by utilizing the centrifugal force and a spring force acting opposite thereto, when the speed of rotation of the rotary driving shaft exceeds a predetermined value the centrifugal force overcomes the spring force to move the eccentric shaft from the central position to the eccentric position and when said speed lowers below said value the spring force overcomes the centrifugal force to move the eccentric shaft from the eccentric position to the central position. However this is not practical, because the spring is required to be extremely strong and it is very difficult in view of the space to locate such a strong spring on the rotary driving shaft or the eccentric shaft. It is, therefore, necessary to take a cautious attitude in using the centrifugal force.

As a result of our investigations of the abovedescribed problems, a conclusion has been made that it is better that essentially no centrifugal force be used as an external force for moving the eccentric shaft, or the centrifugal force is used to move the eccentric shaft from the eccentric position to the central position and the inertia force due to the acceleration caused at the initiation and stoppage of rotation of the rotary driving shaft is used as a main external force for moving the eccentric shaft. The reason why the centrifugal force should be directed to move the eccentric shaft from the eccentric position to the central position is based on the fact that in case of the movement of the eccentric shaft from the eccentric position to the central position a larger external force is required than that in case of the reverse movement of the eccentric shaft.

According to the present invention, a friction welding apparatus is provided for welding a pair of members in which the welding surfaces of said members are contacted under pressure with each other, and the relative circular orbit motion of the members causes friction thereby heating and melting said welding surfaces. The relative circular orbit motion being stopped to locate said welding surfaces in a determined position, comprises eccentric means including a rotary driving shaft, an inertia member disposed around the periphery of said rotary driving shaft, said inertia member being rotated by said rotary driving shaft and is stopped with said welding surfaces in a predetermined position. The friction welding apparatus comprises eccentric means including a driving shaft and engaged with said inertia member so as to be moved by the relative angular movement of said inertia member relative to said rotary driving shaft between a co-axial position with the axis of said rotary driving shaft and an eccentric position spaced by a predetermined distance apart therefrom. A movable table is engaged through a bearing with said eccentric shaft for supporting the member to be welded, said movable table being connected by motion restricting means to a fixed frame which is capable of causing a substantial relative circular orbit motion in a plane perpendicular to the axis of said rotary driving shaft, said inertia member being angularly moved by rapid increase in the speed of said rotary driving shaft relative thereto from a first position to a second position such that said eccentric shaft is moved from said co-axial position to said eccentric position and said movable table is put in the relative circular orbit motion. Said inertia member is returned by rapid stoppage of said rotary driving shaft from the second position to the first position such that the eccentric shaft is returned to the co-axial position and the movable table is stopped at the determined position.

With such arrangement, the position of the inertia member relative to the rotary driving shaft is restrained between one position in which the eccentric shaft assumes the central position and another position in which the eccentric shaft assumes the eccentric position. The acceleration at the initiation of rotation of the rotary driving shaft acts to move the inertia member from said one position to said another position, and the resultant force of the centrifugal force generating on the inertia member which is at least in said another position when rotation of the rotary driving shaft does not substantially affect the movement of the inertia member permitted relative to the rotary driving shaft or acts to move the inertia member from one position to the other position.

In this manner, the centrifugal force due to the inertia member as the external force for moving the eccentric shaft in rotation is not substantially used or is used to move the eccentric shaft from the eccentric position to the central position, and only the inertia force based on the acceleration caused when initiation or stoppage of rotation of the rotary driving shaft is used as the main external force for moving the eccentric shaft.

FIGS. 20 through 23 show examples of a click stop mechanism for stabilizing the operation of the apparatus at the eccentric and central positions;

Figure 1:
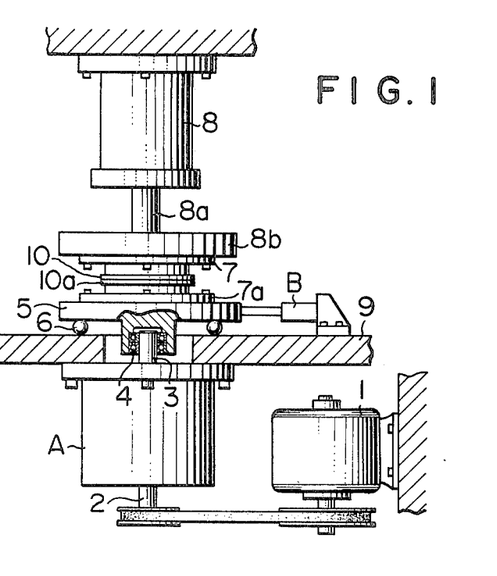
FIG. 1 is a schematic representation of an overall construction of a circular orbit motion type friction welding apparatus of the present invention.

FIG. 1 shows the overall construction of an example of a circular orbital motion type friction welding apparatus in which an electric motor 1 is connected by a suitable rotational motion transmitting means to a rotary driving shaft 2 constituting a part of an eccentric device A and an eccentric shaft 3 is connected to the shaft 2 in such a relation as will be described hereinlater, and is engaged at one end with a bearing 4 secured to a movable table 5. Said movable table 5 is positioned on a frame or base plate 9 through a plurality of steel balls 6 or suitable lubricating means.

A pressure shaft 8a of pressure device 8 has at its one end a fixed pressure table 8b to which a holder 7 is fixedly provided to face holder 7a also fixed to said movable table 5. Reference numerals 10, 10a in the drawings designate members to be welded.

Figure 2:
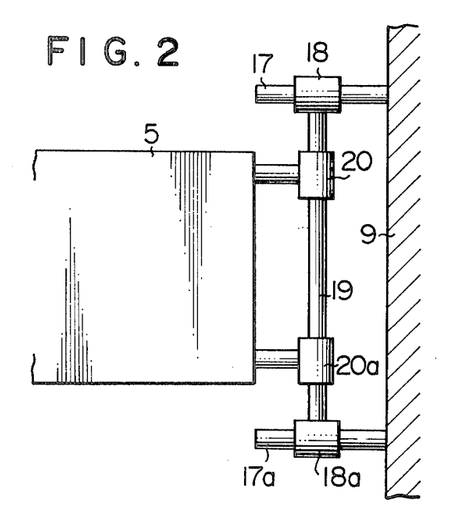
FIG. 2 is a plan view showing more in detail a portion B of the apparatus of FIG. 1.

Motion restricting device B is arranged to cause a motion of the movable table 5 without causing angular movement and thus cause a parallel motion in a plane, and its example is shown in FIG. 2.

The base plate 9 is provided with a first member 17a on which a second member 19 is movably mounted through sliders 18, 18a and the movable table 5 is also provided through sliders 20, 20a.

The method for welding a pair of members to be welded using the friction welding apparatus of the invention will next be explained.

The pair of members 10 and 10a to be welded is mounted on said holders 7 and 7a, respectively, and then the pressure device 8 is operated to urge the abutting welding surfaces under pressure against each other. When said motor 1 is initiated to rotate under the condition that the eccentric shaft is centrally positioned, the driving shaft 2 begins to rotate and at the same time the eccentric shaft 3 also begins to rotate around its own axis without its position shifted.

At this time, no motion of said movable table 5 is caused, because it is connected through the bearing 4 to the eccentric shaft 3 and its angular movement is restrained by said motion restricting device B.

When the eccentric device A is operated to move the eccentric shaft 3 to its eccentric position, the eccentric shaft 3 is initiated to cause revolutional movement while rotating around the center axis of the rotary driving shaft 2, and accordingly the revolutional movement of the eccentric shaft 3 is only transmitted to the movable table 5 so that the latter is initiated to move on the circular orbit thereby generating pressure between the welding surfaces of the members, and the frictional heat caused by the relative movements, and ultimately the members are melted at their abutting surfaces.

At time when the melting of the members has sufficiently progressed, the eccentric device A is operated to move the eccentric shaft 3 to its central position and thus the movement of the movable table 5 stops irrespective of the rotation (self-rotation) of the rotary driving shaft 2 and the eccentric shaft 3, and as the welding surfaces of the members are cooled the welding operation is completed.

The eccentric device A of the friction welding apparatus described above will be further explained by reference to FIGS. 3 and 5.

A preferred example of the engagement between the inertia member and the rotary driving shaft is such that the inertia member is connected rotatably relative to the rotary driving shaft and the axis of the inertia member relative to the rotary driving shaft is placed so as to be aligned with the axis of the rotary driving shaft and the inertia member is preferably formed into a cylindrical configuration. The cylindrical configuration is preferably provided with a step or concave portion to fit on the eccentric shaft. Alternatively, a suitable weight may be provided around a group of small mass cylinders and in this case it is preferable in consideration of the balance of motion that a plurality of weights is provided to generate equal inertia forces with respect to the axis of the rotary driving shaft.

In such an example, even when centrifugal forces are caused on the inertia member the centrifugal forces caused on all of the mass points of the inertia member will be directed through the axis of rotation of the rotary driving shaft in a direction apart therefrom, and said axis of rotation is aligned with the axis of rotation of the inertia member relative to the rotary driving shaft so that the centrifugal forces are not concerned with the movement or rotation of the inertia member relative to the rotary driving shaft. FIGS. 3 through 5 show such a preferred example.

Figure 3:
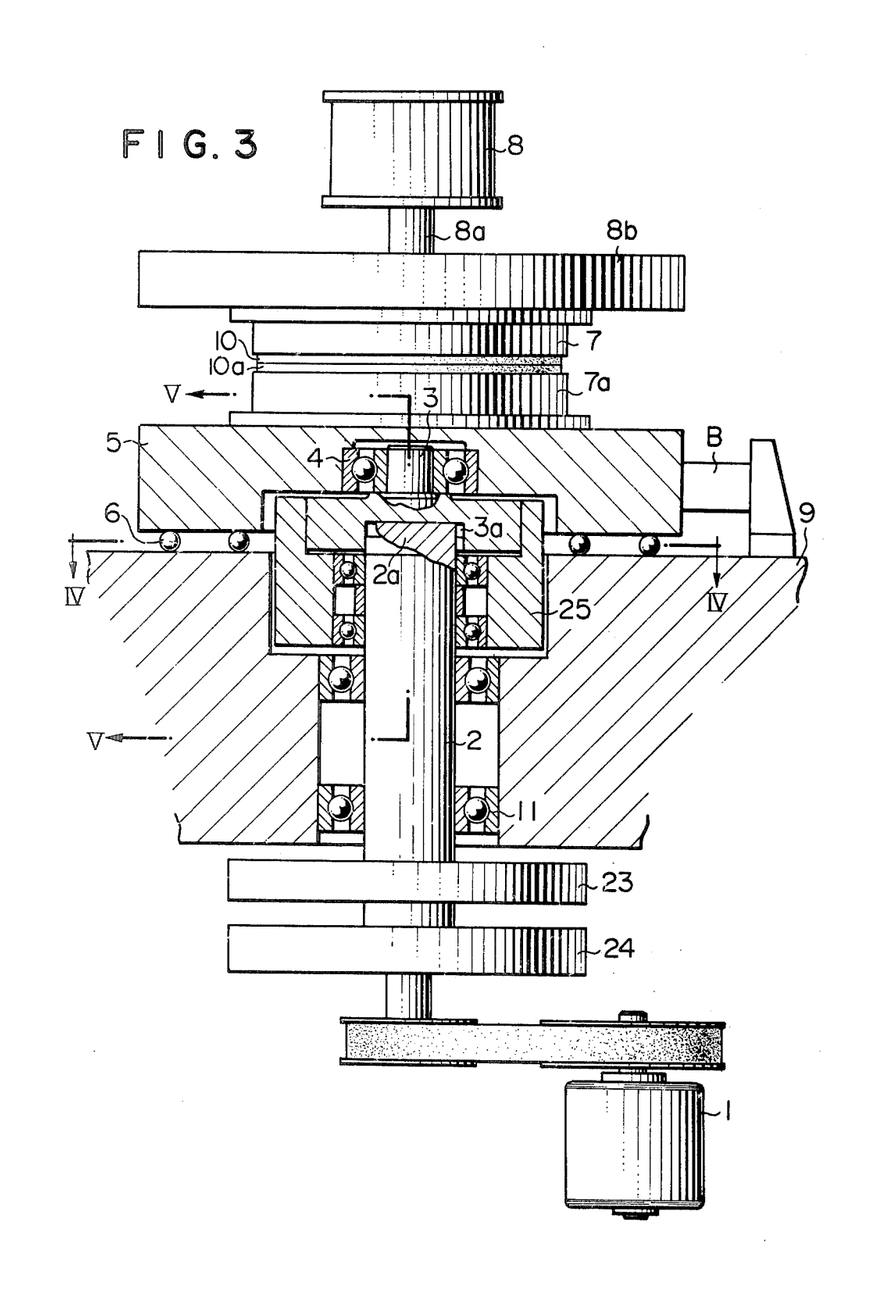
FIG. 3 is a part-sectional view showing an overall construction of a first embodiment of the apparatus of the present invention.
Figure 4:
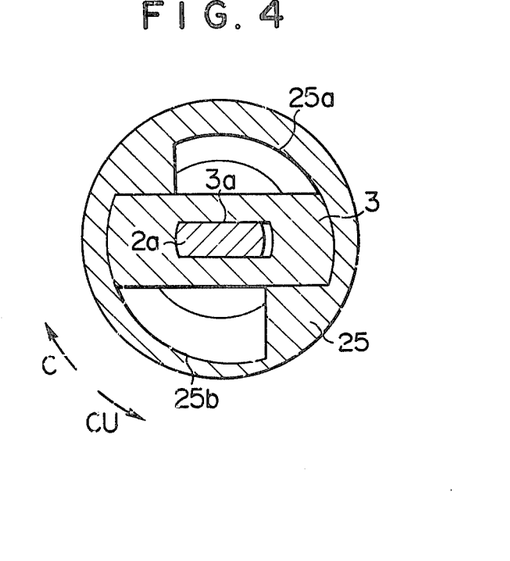
FIG. 4 is a cross-section taken along a line IV—IV of FIG. 3.
Figure 5:
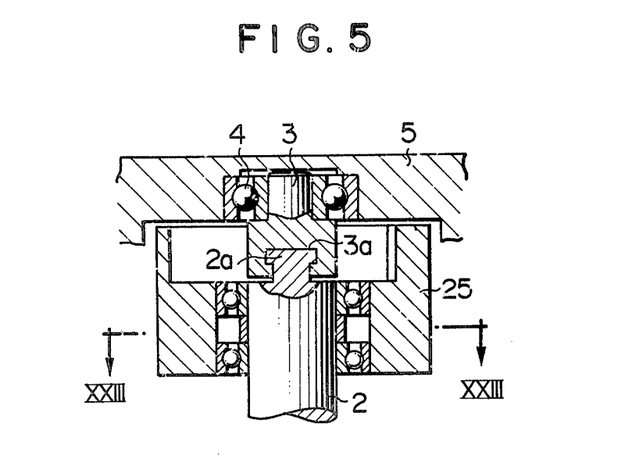
FIG. 5 is a longitudinal section taken along a line V—V of FIG. 3, and in FIGS. 4 and 5 an eccentric shaft is in its central position.

In FIGS. 3 through 5, the rotary driving shaft 2 is rotatably disposed through bearing 11 on a stationary system or the like, such as a frame or base plate 9, and is also connected to the motor 1 through a brake 23 and a clutch 24. In case the starting-stopping acceleration of the rotary prime mover is sufficiently high, there is required no provision of any brake and clutch in the driving system. It is, however, usual that the electric motor has a sufficiently high starting acceleration, but there is no means for increasing the stopping acceleration, and it is, therefore, necessary to decrease the inertia of rotation by the clutch as well as to increase the stopping acceleration by the brake, thereby ensuring the eccentric and centripetal operations.

A connecting portion 2a of the rotary driving shaft 2 is engaged with a groove portion 3a of the eccentric shaft 3 which is adapted to be movable relative to the shaft 2 within a below-mentioned range in a plane substantially perpendicular to the shaft 2. A cylindrical inertia member 25 has a concave portion at its upper portion to fit the eccentric shaft 3 and is rotatably mounted on the rotary driving shaft 2 with the axes of both of the shifts aligned with each other, and the engagement of the inertia member 25 with the eccentric shaft 3 is in such a relationship as will be described below. Furthermore, the eccentric shaft 3 is connected through the bearing 4 to the movable table 5 which is, in turn, slidably engaged with the base plate 9 through a plurality of steel balls 6 or suitable lubricating means and connected to the motion restricting device B.

The movable table will next be described in detail. The movable table is provided with means for supporting the member to be welded and only a predetermined circular orbital motion of the movable table should be freely caused in a plane parallel to said table and thus perpendicular to the axis of the rotary driving shaft. In order to impart such motional function to the movable table, in the preferred embodiment, there are provided a function for supporting it on the frame or base plate to establish the motion of the movable table in the direction parallel to its plane in response to the pressure perpendicular to said table during the welding operation, and a function for restricting the motion to prevent motions other than the circular orbital motion.

Figure 14:
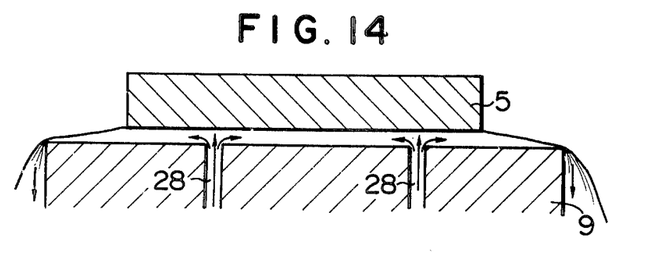
FIGS. 14 and 15 are sectional views of examples of a movable table incorporated in the apparatus of the present invention.
Figure 15:
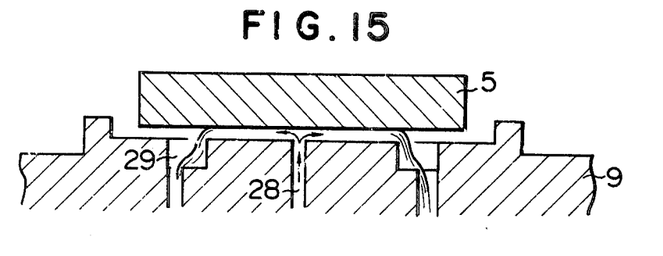

It is preferable to arrange the supporting device such that as shown in FIG. 1 a plurality of sheet balls 6 is interposed between the movable table and the body. In this device, the movable table is movable with rolling friction in any directions parallel to the plane of said table. Alternatively, as shown in FIG. 14 pressurized fluid, such as pressurized air or oil, is interposed between the frame and the movable table to establish the fluid lubrication in all directions thereby permitting the free motion of the movable table. It is, however, difficult to seal the fluid existing surface, because of the high speed motion of the movable table. Therefore, practically the pressurized fluid is continuously supplied from one of the mating surfaces as shown in FIG. 14. It is not necessary that the fluid layer covers the whole mating surfaces, but only that it covers only the portion of the surfaces substantially pertaining to supporting the movable table. Therefore, a fluid discharging groove or port 29 is provided in a portion of the surface as shown in FIG. 15 to discharge the fluid to the exterior for preventing leakage of the fluid, and this is advantageous particularly in case of using the pressurized oil or the like.

The thickness of the fluid layer depends upon the welding condition and particularly upon the pressure and the kind of the fluid used. Thickness ranges between about 5 and about 200 microns are most useful and have a good supporting ability. Therefore, the ejecting pressure of the pressurized fluid is set to form a fluid layer having such a useful thickness. It is desirable that the supply port of the pressurized fluid provided in the frame or the movable table is a linear or annular slit or a plurality of small holes. In either cases, it is also desirable that a further slit or small holes be formed in the table in symmetrical disposition with those formed in the frame.

When such support for permitting the free motion is used, it is necessary that the engagement of the movable table with the frame is made by the motion restricting device to restrict the motion of the movable table only to the circular orbital motion. As such motion restricting device, there can be adopted a combination of two or more linearly slidable elements 18, 20 which are not in parallel disposition as shown in FIG. 2, for example. Such device may have various forms in accordance with practical use, and linearly slidable elements intersecting at right angles are most easily manufactured. Such elements may be of a type ordinarily used, such as a thrust shaft and a thrust bearing, a spline shaft, a slot and a pin.

Figure 16:
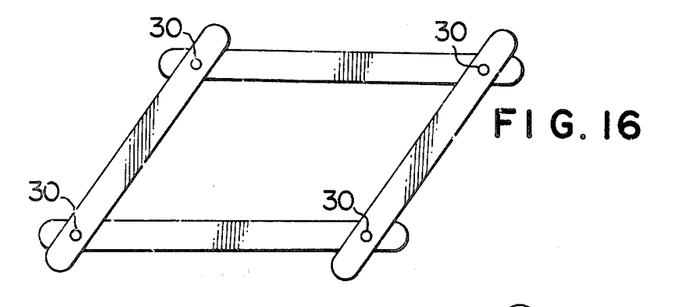
FIG. 16 shows a parallelogram link applicable to the apparatus of the present invention.
Figure 17:
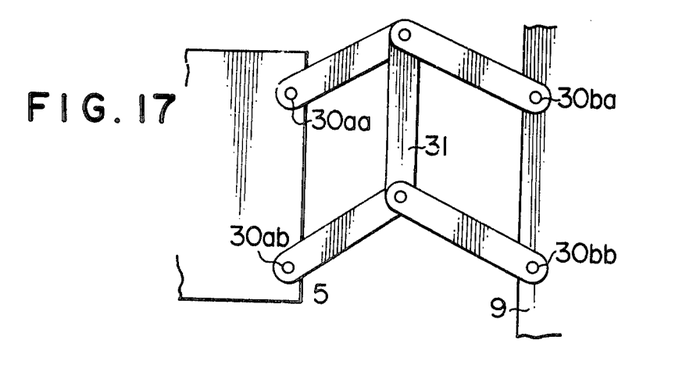
FIGS. 17 and 18 show examples of means for restricting the movement of the movable table.

As a motion restricting device, a parallelogrammatic linkage as shown in FIG. 16 can be used in which each connecting point 30 is rotatable in a plane. In this case, two or more parallelogrammatic linkages having at least one common link element are used. In this case, two connecting points 30aa, 30ab on the side of the movable table and two connecting points 30ba, 30bb on the side of the frame are positioned in parallel and equispaced relationship with one another as shown in FIG. 17, and double parallelogrammatic linkages are arranged such that common element 31 is in parallel with and has equal length to the straight line extending between said connecting points. Such mechanism has a compact construction and is easily manufactured.

Figure 18:
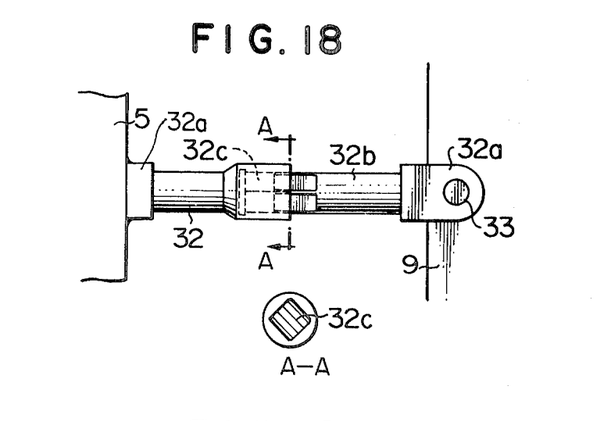

As a motion restricting device of simple construction, a system shown in FIG. 18 can be adopted in which a pair of rod-like members 32, 32b are telescopically engaged at their adjacent ends with each other for longitudinal movement with the end 32c of the member 32b slidably inserted into the end of the member 32, and the other end 32a of the members, 32b is pivotally connected to the frame 9, and the other end 32a of the member 32 is fixed to the table 5. This motion restricting mechanism permits a slight rotational movement, but such rotational movement can be substantially neglected by sufficiently lengthening the rod-like members in comparison with the diameter of the orbit. Practically, there is caused no problem when the maximum length of the rod-like members is longer than that of the orbit, although this depends upon the required accuracy of the products. Furthermore, the range of the telescopic movement of the members should be larger than the diameter of the path of movement of the movable table when the latter is in the circular orbital motion.

Figure 19:
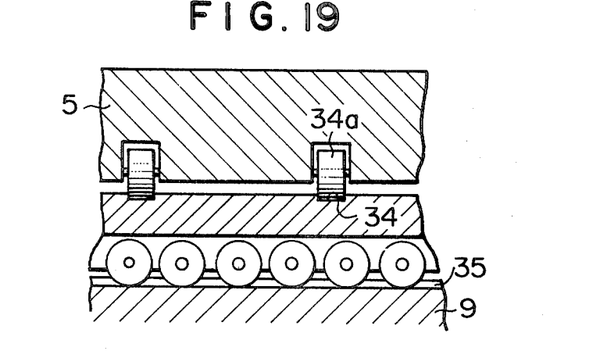
FIG. 19 is a sectional view of a further example of the movable table.
Figure 20:
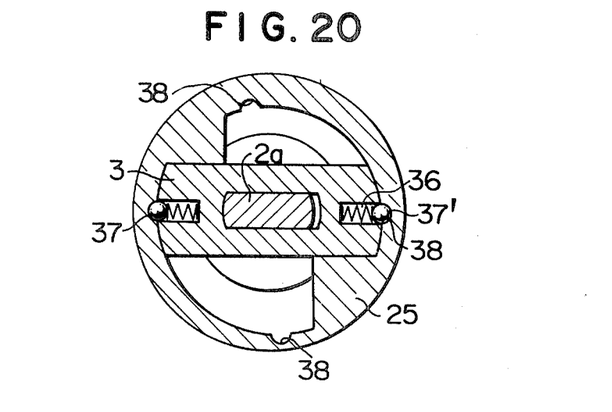
Figure 21:
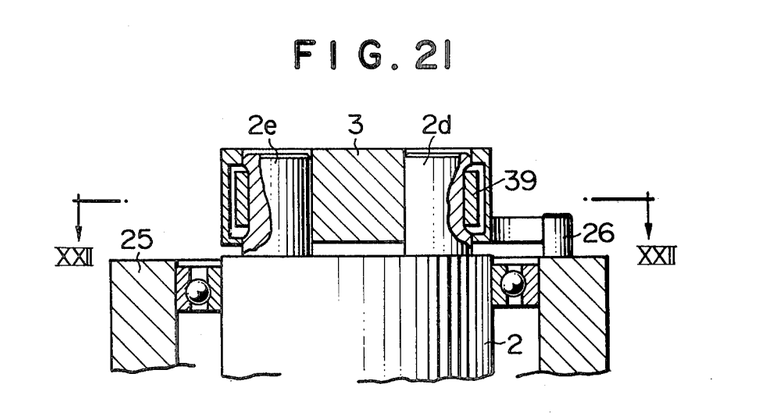
FIG. 21 is a section taken along a line XXI—XXI of FIG. 22.
Figure 22:
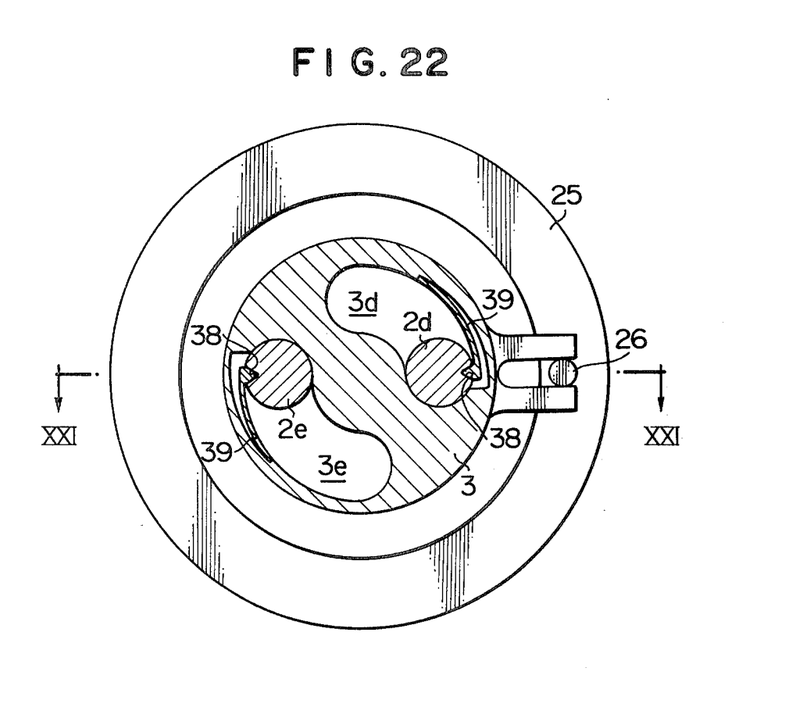
FIG. 22 is a section taken along a line XXII—XXII of FIG. 21.

The above examples are arranged such that the movable table is subjected to the circular orbital motion by the combination of the freely movable supporting device and the motion restricting device. In an alternative arrangement, non-parallel linear orbits are independently provided and overlap each other to be able to simultaneously exert both functions of supporting the movable table and of restricting the motion. FIG. 19 shows an example of such arrangement in which a first orbit or track 34 supports the movable table 5 through axles 34a, and a second orbit or track 35 which is not in parallel with the first orbit is provided on the frame 9 to support the portion above the first orbit through axles 35a. For these orbits, sliding elements are only permitted to move linearly, the elements being, for example, ordinary rails, a plurality of rollers having parallel axes, a plurality of linearly restrained rigid balls, thrust bearings or spline shafts.

The interrelation between the rotary driving shaft 2, the eccentric shaft 3 and the inertia member 25 will next be described in detail. As described above, the eccentric shaft 3 is engaged with the rotary driving shaft 2 for reciprocating movement in the direction of a plane lying perpendicular to the axis of the shaft 2, and at one end of this reciprocating movement the central axis of the eccentric shaft 3 (same as that of said bearing 4) is brought into alignment with the central axis of the rotary driving shaft 2 to assume its central position. At the other end of said reciprocating movement, the axis of the eccentric shaft 3 is spaced apart by a predetermined distance from the axis of the shaft 2 in order to assume its eccentric position. The positioning of the eccentric shaft 3 in said central or eccentric position is determined by the angular position of the inertia member 25 relative to the rotary driving shaft 2 or the eccentric shaft 3.

In FIG. 4, cam surfaces 25a and 25b of the inertia member 25 are contacted with the eccentric shaft 3 to restrain the latter so that the relative position of the eccentric shaft 3 to the rotary driving shaft 2 is defined. When the inertia member 25 rotates relative to the shaft 2 in the direction of arrow CU, said cam surfaces 25a, 25b cause the eccentric shaft 3 to move from the eccentric position towards the central position, and when the member 25 rotates in reverse in the direction of arrow C, the cam surfaces cause the eccentric shaft 3 to move from the central position towards the eccentric position, and thus the eccentric shaft 3 is permitted to assume its central and eccentric positions within the relative angular range in which the inertia member 25 can be positioned relative to the rotary driving shaft 2.

With such arrangement, the clutch 24 and the brake 23 are initially released and the motor 1 is energized to make ready for rotating the rotary driving shaft 2 in the direction of the arrow UC of FIG. 4. When the clutch 24 is operated, the rotation of the shaft 2 is rapidly accelerated. In such a situation, the inertia member 25 tends to maintain stationary position due to its inertial mass and thus relative rotation is caused between the rotary driving shaft 2 and the inertia member 25 or inertia force is caused by the rotational acceleration of the shaft 2 and the moment of inertia of the inertia member 25. When this inertia force is enough to move the eccentric shaft 3, the shaft 2 is rotated relative to the inertia member 25 in the direction of the arrow CU of FIG. 4 and, in this arrangement, the eccentric shaft 3 is moved to said eccentric device position.

In this manner, when the eccentric shaft 3 has moved to the eccentric position said movable table 5 makes the predetermined circular orbital motion and a frictional force due to such circular orbital motion is added to the eccentric shaft 3 in the tangential direction of the circular orbital motion. This force does not pertain to the movement of the eccentric shaft 3 relative to the rotary driving shaft, and the mass of the movable table 5 and parts attached thereto and the centrifugal force caused by their circular motion acts in the direction to move the eccentric shaft 3 away from the central position, that is the direction that the eccentric shaft tends to assume is the eccentric position, such that the rotation of the shaft 2 becomes constant, and the eccentric shaft 3 is maintained in the eccentric position even when the acceleration is diminished. The rotation of the shaft 2 is initiated and accelerated and during its constant rotation thereafter, the movable table 5 continues to make said circular orbital motion.

In this condition, the members to be welded are melted at the area to be welded, and when such melting has sufficiently progressed the clutch 24 is released and the brake 23 is operated to rapidly stop the rotary driving shaft 2. At this time, the inertia member 25 tends to continue the initial rotation, that is the rotation in the direction of the arrow CU of FIG. 4, so that the inertia member 25 generates an inertia force relative to the shaft 2 in the direction of the arrow CU and this force tends to move the eccentric shaft 3 from said eccentric position towards the central position. When this force is sufficiently large, the inertia member 25 is angularly moved relative to the shaft 2 in the direction of the arrow CU and thus the eccentric shaft 3 is guided by the cam surfaces 25b and 25a of the inertia member 25 to move to said central position. As a result, the movable table 5 is stopped in a conventional manner and is conveyed to the determined position, and the members to be welded are mutually joined in the desired welding position.

This stoppage of the movable table 5 is caused by the facts that the radius of rotation or revolution of the eccentric shaft 3 with respect to the rotary driving shaft 2 is reduced to zero and that the self-rotation of the shaft 3 is stopped, such that there will be caused no residual motion due to any error in the central position of the eccentric shaft 3 and accordingly no reduction of the welding strength will be caused at all.

In the examples of the present invention, it is advantageous that the operation of the apparatus not be affected by the position of the centroid of the inertia member 25 with respect to its axis of rotation. When the eccentric shaft 3 is in the eccentric position and the rotary driving shaft 2 rotates, the movable table 5 is moved with the predetermined radius of revolution so that the centrifugal force caused by the mass of the movable table 5 and the associated parts is applied to the eccentric shaft 3 and thus the rotary driving shaft 2, and the position affected by this force is moved relative to the stationary system, as the shaft 2 rotates, and thus fatigue by vibration will be caused in various portions of the apparatus and undesired sound will be emitted therefrom.

This can be improved by positively deviating the centroid of the inertia member 25 in respect of its axis of rotation. The definition is now made that the radius of eccentricity or radius of revolution producing said centrifugal force (the distance of the axis of the eccentric shaft 3 and the axis of the rotary driving shaft 2) is r, the inertial mass of the load for producing the centrifugal force is m, the inertial mass is substantially loaded on the eccentric shaft, the distance from the axis of rotation of the inertia member 25 to its centroid is R and the mass of the inertia member is M. When the arrangement is made such that when the eccentric shaft 3 is in its eccentric position and the inertia member 25 is in such a position as is corresponding thereto, said centroid lies in a plane including the axis of the shaft 2 and the axis of the shaft 3 and the centroid is provided to position opposite to the axis positioned at this time of the eccentric shaft 3 in respect of the axis of the rotary driving shaft 2, a centrifugal force in a direction opposite to that of the aforementioned centrifugal force is caused to improve the adverse effect mentioned above. In the embodiment, the equation $MR = \alpha mr$ should be established wherein $\alpha$ is a constant and $0 < \alpha < 2$. Desirably, $\alpha = 1$.

In an alternative example of the preferred relationship between the inertia member and rotary driving shaft, the inertia member is connected rotatably relative to the rotary driving shaft, and the axis of rotation of the inertia member relative to the rotary driving shaft is disposed apart from the axis thereof. The main portion of this practical example is shown in FIGS. 6 through 8.

In this figures, fixed to the rotary driving shaft 2 are a shaft 2b for the inertia member and a shaft 2a for the eccentric shaft, the shaft 2b being rotatably connected with the inertia member 25 and the shaft 2a being rotatably connected with the eccentric shaft 3 which is provided with a groove 3a for sliding engagement with a pin 26 fixed to the inertia member 25. As in conventional means, the movable table 5 is rotatably engaged through the bearing 4 with the eccentric shaft 3. Furthermore, the engagement between the eccentric shaft 3 and the shaft 2a is made such that the range of the relative angular movement of these shafts is limited by a projection 2c fixed to the shaft 2a and stops 3b and 3c provided on the shaft 3.

Figure 8:
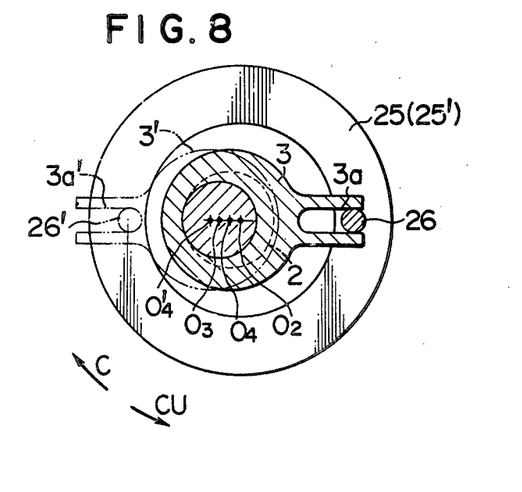
FIG. 8 is a cross-section taken along a line VIII—VIII of FIG. 6, and in FIGS. 7 and 8 the eccentric shaft is in the central position and the two dots and dash lines show the condition that the eccentric shaft is in its eccentric position.

In FIG. 8, the axis of the eccentric shaft 3, namely an axis $O_4$ of the relative rotation between the eccentric shaft 3 and the movable table 5 is in parallel with and spaced by a distance a apart from the axis of the shaft 2a, namely an axis $O_3$ of the relative rotation between the shafts 2a and 3, the axis $O_3$ being in parallel with and spaced by the distance a apart from an axis $O_1$ of the rotary driving shaft 2. Moreover, the center axis of the shaft 2b, that is the axis $O_2$ of rotation of the inertia member 25 relative to the shaft 2b is in parallel with the axis $O_1$ and is spaced by an appropriate distance apart therefrom, and the centroid of the inertia member 25 substantially lies in the axis $O_2$.

Figure 6:
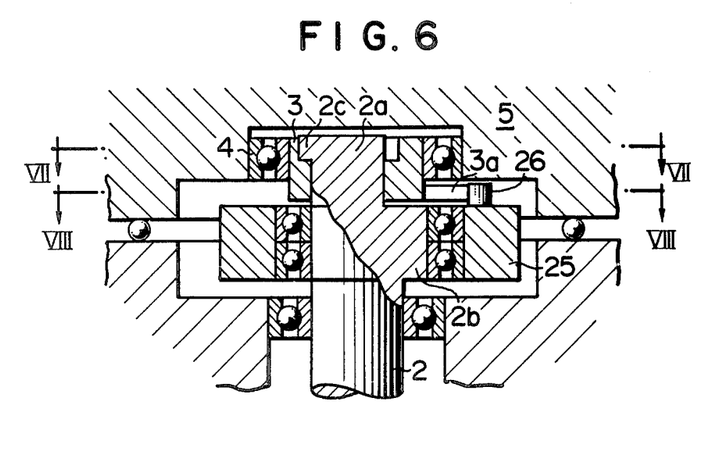
FIG. 6 is a sectional view of a main portion of a second embodiment of the apparatus of the present invention.
Figure 7:
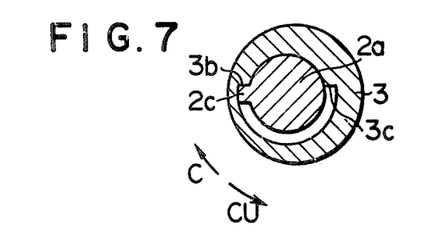
FIG. 7 is a part of a cross-section taken along a line VII—VII of FIG. 6.

In the device arranged as described above, when the rotary driving shaft 2 is initiated to rapidly rotate in the direction of the arrow CU from the stationary condition shown by solid lines in FIGS. 6 through 8 and in which the axes $O_1$ and $O_4$ are aligned with each other, the inertia member 25 tends to maintain its stationary position by its inertial mass to act on the inertia forces relative to the rotary driving shaft 2.

One of these inertia forces is the centrifugal force resulting from the component of revolution of the inertia member 25 around the axis $O_1$. As described, however, the centroid of the inertia member 25 substantially lies in the axis $O_2$ such that the centrifugal force have no substantial moment for rotating the inertia member 25 around the axis $O_2$. Another inertia force is the force caused by the acceleration of the rotational component of the shaft 2b and this is generated as a moment around the axis $O_2$ and directed in a direction of an arrow C to cause the inertia member 25 to move relative to the shaft 2 or the portion tending to move in the same direction of the shaft 2.

In FIG. 8, therefore, the inertia member 25 has a force causing it to tend to move in the direction of the arrow C relative to the shaft 2, and when this force is enough large it is actually moved and accordingly the eccentric shaft 3 is urged by the pin 26 to rotate around the shaft 2a.

In FIGS. 7 and 8, the relative position of the shafts 3 and 2a shows the fact that the projection 2c is angularly moved from a position at which it abuts against the stop 3b to a position at which it abuts against the stop 3c, and thus it is moved from the central position at which said axis $O_4$ is aligned with the axis $O_1$ to the eccentric position, that is the position $O_4'$. In the event that the rotation of the rotary driving shaft 2 is accelerated or maintained at a constant speed, the eccentric shaft 3 in that eccentric position is in stable condition due to the centrifugal forces caused on said movable table 5 and the like and the frictional force caused between the members to be welded, and in this condition the movable table 5 is subjected to the desired frictional motion.

Under such condition, when the members to be welded have sufficiently melted at their welding portions, the rotary driving shaft 2 is stopped and a sufficient acceleration opposite to the acceleration is generated to cause the reverse operation to return said eccentric shaft 3 to the central position. Namely, the pin 26 on the eccentric member 25 is angularly moved in the direction of the arrow CU relative to the shaft 2 from the position 26' in FIG. 8 to the position 26, and accordingly the groove 3a of the eccentric shaft 3 or the eccentric shaft 3 is rotated in the direction of the arrow CU from the position 3a' or 3' to the position 3a or 3 at which the projection 2c abuts against the stop 3b, such that the axis $O_4$ of the eccentric shaft 3 is moved from the position $O_4'$ to the position $O_1$ ($O_4$), and the movable table 5 is stopped at the predetermined position to complete the welding operation.

In the second embodiment just described, when the eccentric shaft 3 is in said eccentric position the axis $O_2$, $O_1$ and $O_4'$ are brought into alignment with one another as shown in FIG. 8 and the axis $O_4'$ is positioned opposite to the axis $O_2$ in respect of the axis $O_1$, and furthermore, the distances between the axes $O_2$, $O_1$ and $O_4'$ and the masses of the inertia member 25, the movable table 5, etc. are appropriately selected as described in connection with the first embodiment, and then the total centrifugal force applied to the shaft 2 can be apparently reduced to zero or an extremely small value as in the case of the first embodiment. In this case, the equation $MR = \alpha mr$ should be established wherein $\alpha$ is a constant and $0 < \alpha < 2$, m is a loaded inertial mass during the friction welding operation, M is the mass of the inertia member, r is the radius of eccentricity, and R is a distance between the axis of rotation of the inertia member and the axis of rotation of the rotary driving shaft. Preferably, $\alpha = 1$. In either of the first and second embodiments, the reduction or minimization of the adverse effects caused by the centrifugal forces of the movable table, etc. can be achieved by fixing an independent inertia member to a suitable portion of the rotary driving shaft, other than the arrangement described above.

In the second embodiment, the centrifugal force does not act as a force for causing the angular movement of the inertia member relative to the rotary driving shaft, but an arrangement can be used in which the centrifugal force is effectively utilized in accordance with the spirit of the present invention.

When the rotary driving shaft rotates around its axis $O_1$, the axis $O_2$ of the inertia member is rotated around the axis $O_1$, so that the plane passing through both of the axes $O_1$ and $O_2$ is also rotated. In case that an eccentric mass is provided on the inertia member (namely, the position of its centroid being deviated from the center of rotation), it should be provided in such a position that when the eccentric shaft is in the eccentric position there is generated a moment for causing a relative rotation of the inertia member around the axis $O_1$ of the rotary shaft in a direction to align the eccentric shaft with the rotary driving shaft, although, in general, the inertia member may be positioned either side of said plane in response to the direction of rotation of the inertia member. Namely, when the plane extending through the axis $O_2$ of the inertia member and the axis $O_1$ of the rotary driving shaft rotates in such a way that the eccentric shaft is in the eccentric position, the centroid on the inertia member should be positioned on one side of said plane within the range of the angle of 0–180° rearward of the locus of rotation of the axis of the inertia member on said plane.

For example, in FIG. 8, when the relative position and rotation of the respective parts are in such a situation that the eccentric shaft 3 is in said eccentric position, an eccentric mass is added to an appropriate part of the lower portion as viewed in FIG. 8 from the plane (this being seen as a line in this figure) passing through the axes $O_1$ and $O_2$ on the inertia member (positioned at 25' in FIG. 8), or the mass distribution of the inertia member 25 (namely, its position being the position of the centroid) causes the same effect, and thus the centrifugal force caused by said eccentric mass produces a moment for causing a relative rotation of the inertia member 25 around said axis $O_2$.

Namely, in FIG. 8, when said centroid is on the inertia member 25 and also below the plane passing through the axes $O_1$ and $O_2$, as viewed in FIG. 8, the centrifugal force acting on the centroid acts on its portion in a direction from the axis $O_1$ to the position of the centroid, and accordingly this force tends to cause the inertia member 25 to rotate in the direction of the arrow uc relative to this rotary driving shaft 2 or the shaft 2b for the inertia member. It is apparent that this force moves the eccentric shaft 3 from said eccentric position towards the central position, and thus when the inertia member 25 has a same moment of inertia in respect of its axis $O_2$ the above-described disposition of the centroid is better than positioning the centroid at its center of rotation, because when the rotation of the rotary driving shaft is stopped the force for moving the eccentric shaft 3 from said eccentric position towards the central position becomes large thereby stabilizing the operation of the apparatus.

Figure 9:
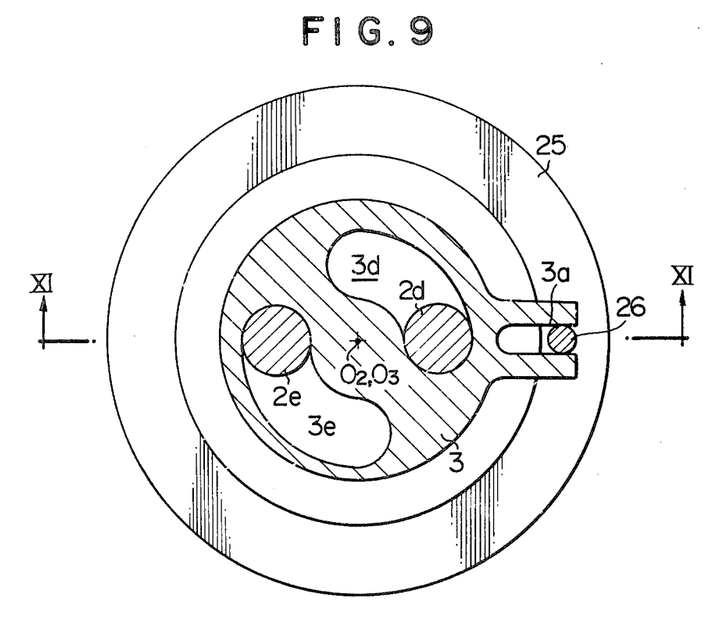
FIGS. 9 and 10 are sectional views showing the operation of a third embodiment of the present invention.
Figure 10:
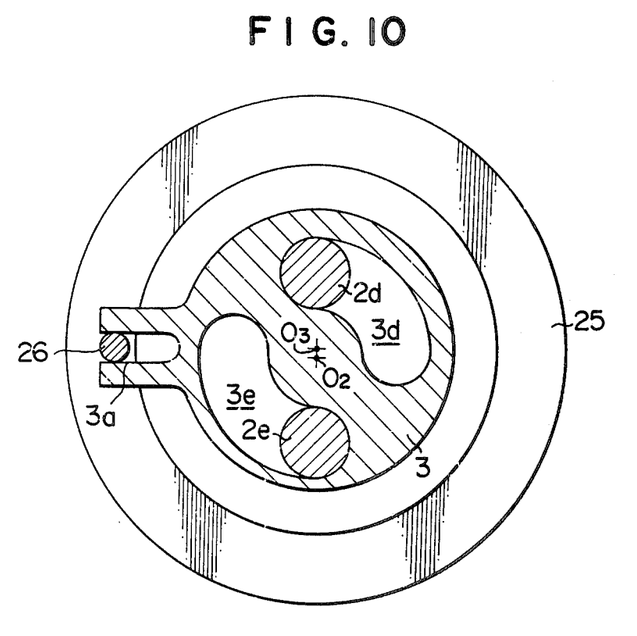
Figure 11:
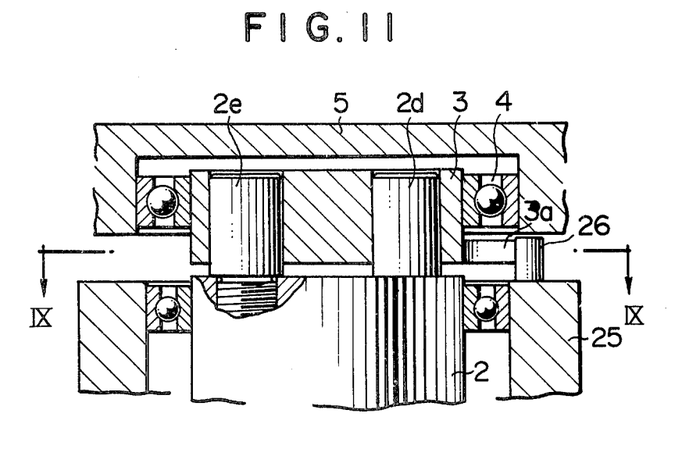
FIG. 11 is a section taken along a line XI—XI of FIG. 9.

A third embodiment shown in FIGS. 9, 10 and 11 is a modification of the eccentric shaft 3 and the shaft 2a therefor of the second embodiment.

In the embodiment, a pair of spaced connecting pieces 2d, 2e is fixed to one end of the rotary driving shaft 2, the pieces having axes parallel with the axis of the shaft 2 and engaged with the slots 3d, 3e, respectively, formed in the shaft 3. Similar to the second embodiment, the groove 3a formed in the shaft 3 is in sliding engagement with the pin 26 provided on the eccentric member 25 which, in turn, is engaged through the bearing 4 with the movable table 5.

Now assuming a specific imaginary line in parallel with and spaced by a distance E apart from the axis $O_3$ of the eccentric shaft 3, this line always coincides with another specific imaginary line which is in parallel with and is spaced by a distance E apart from the axis $O_2$ of the rotary driving shaft 2.

Therefore, the eccentric shaft 3 and the rotary driving shaft 2 can relatively be rotated within the restricted range around the respective imaginary lines, and in the condition of FIG. 9 the axis $O_2$ of the shaft 2 and the axis $O_3$ of the shaft 3 coincide with each other and in the condition of FIG. 10 these axes are spaced by a distance e apart from each other.

Figure 12:
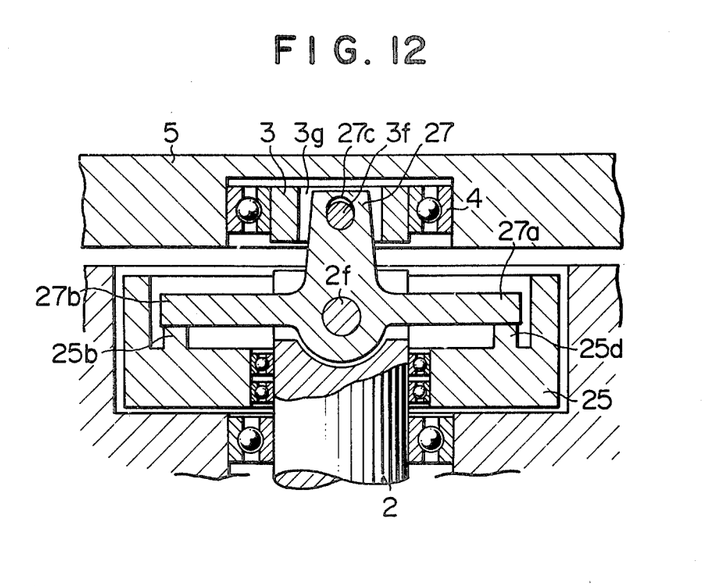
FIGS. 12 and 13 are sectional views showing the operation of a fourth embodiment of the present invention with parts assuming different positions therein.

It is, therefore, appreciated that when the shaft 2 is rapidly accelerated the condition of FIG. 11 is changed to the condition of FIG. 12, and during the rapid stoppage of the shaft the reverse operation is performed. Namely, the eccentric shaft 3 can be moved from the central position to the eccentric position and vice versa.

Figure 13:
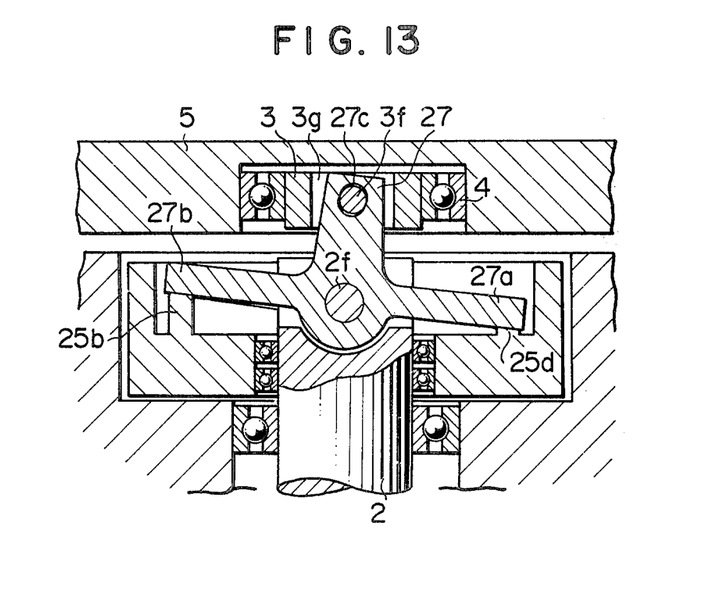

A fourth embodiment shown in FIGS. 12 and 13 is a modification of the connecting pieces of the third embodiment.

In this embodiment, a connecting member 27 is pivotally movable around a pin 2f relative to the rotary driving shaft 2 in a plane passing through the axis thereof. The connecting member 27 is formed at its upper portion with a rectangular-sectional portion which extends into a rectangular hole 3g formed in the eccentric shaft 3. Furthermore, a slot 27c formed in the connecting member 27 is engaged with a pin 3f secured to the shaft 3, the pin 3f extending in parallel with the pin 2f.

Provided on the inertia member 25 are annular cams 25b and 25d the height of each of which is varied circumferentially, such that when the inertia member 25 is rotated relative to the shaft 2 the connecting member 27 is pivotally moved around the pin 2f to cause the eccentric shaft 3 to move relative to the shaft 2.

The embodiments of the present invention are not limited to the embodiments described herein, and various forms can be made without departing from the spirit of the present invention.

In the present invention, moreover, there is provided no spring for making the basic operation, but as auxiliary means for stably maintaining the eccentric shaft in the central position when the rotary driving shaft is topped there may be provided a spring of a suitable strength acting in a direction to urge the eccentric shaft upon the engaging portion between the rotary driving shaft and the eccentric shaft or upon the engaging portion between the rotary driving shaft and the inertia member.

In the present invention, there may be provided means for stabilizing the operation at the central and/or eccentric position to provided a more stable operation of the apparatus. The technique for providing the stable eccentric position by deviating the centroid of the inertia member has already been described. Otherwise, the engaging portions of the rotary driving shaft and the eccentric shaft, the eccentric member and the eccentric shaft, or the rotary driving shaft and the inertia member are engaged with each other through a frictional force of a suitable strength, as auxiliary means. Moreover, a spring of a suitable strength may be provided at such engaging portions to bias the relative position towards the eccentric or co-axial position.

As shown in FIGS. 20 through 23, a click stop mechanism may be provided in the relative position corresponding to the eccentric and/or co-axial position of said each engagement. For example, in FIG. 20 corresponding to FIG. 4 and showing a modification thereof, the click stop mechanism comprises ball- or roll-like followers 37 urged by coiled springs 36 between the eccentric shaft 3 and the inertia member 25, and concave portions 38 formed at the eccentric and co-axial positions for stably retaining said followers 37 therein. In an example of FIGS. 21 and 22 corresponding to FIGS. 9 and 11, furthermore, there is provided a click stop mechanism between the rotary driving shaft 2 and the eccentric shaft 3, the mechanism including leaf springs 39 formed in the shaft 2 in positions corresponding to the projections, and these being provided at the eccentric or co-axial position to achieve the stable positioning thereat. The stable positioning at both of the eccentric and co-axial positions may be achieved by the provision of two pairs of such springs 39.

Figure 23:
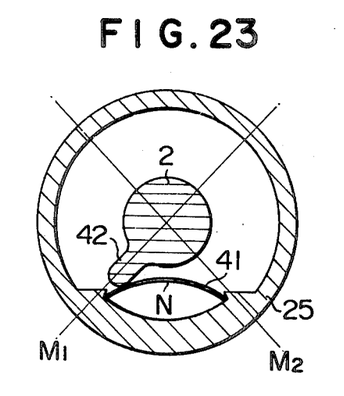
FIG. 23 is a section taken along a line XXIII—XXIII of FIG. 5.

As shown in FIG. 23, furthermore, a leaf spring 41 is provided between projections formed on the inertia member 25 to deform into an arcuate form, and a follower 42 formed on a side wall of the rotary driving shaft 2 abuts against the spring with which it is in sliding engagement. In this case, if the eccentric and co-axial positions are referred to by characters $M_1$ and $M_2$, respectively, in the drawings, the deforming stress applied by the follower 42 to the spring becomes minimum at these positions and the positioning becomes stable thereat. If the follower 42 is in any intermediate position, the spring is deformed downwardly as shown in FIG. 23 to urge the follower and thus the rotary driving shaft towards the eccentric or co-axial position so that the positioning becomes stable. In the example of FIG. 23, the click stop mechanism is provided between the rotary driving shaft 2 and the eccentric member 25, but it may easily be provided between the rotary driving shaft the eccentric shaft or between the eccentric shaft and the inertia member.

It will be understood that similar modifications can be easily made by those skilled in the art. For example, as a modification of the example of FIG. 20, the click stop mechanism may be provided between the rotary driving shaft and the inertia member or between the rotary driving shaft and the eccentric shaft, and as a modification of the example of FIGS. 21 and 22 the click stop mechanism may be provided between the rotary driving shaft and the inertia member or between the inertia member and the eccentric shaft.

The welding condition can be selected in accordance with the quality and dimensions of the material to be welded, but the welding operation becomes difficult in the event that the minimum width of the welding surface of the material to be welded is smaller than the diameter of the orbit. It is, therefore, desirable that the diameter of the circular orbit is smaller than the minimum width of the surface to be welded.

In situations where the members to be welded are a thermoplastic resin, when the circular orbit circulating speed, that is, the speed of movement of the members in the circular orbit motion, is too slow, good result can not be obtained. As a result of the investigation in respect of various thermoplastic resins, the limit of the circulating speed N is related to the diameter of the circular orbit, and it has been found that the speed is must be higher than 15/D circulation times per second. The reference character D refers to the diameter of the circular orbit in centimeter.

What is claimed is:

1. A friction welding apparatus for welding a pair of members in which the welding surfaces of said members are contacted under pressure with each other, relative circular orbit motion of the members causing friction therebetween thereby heating and melting said welding surfaces and the relative circular orbit motion being stopped so that said welding surfaces are positioned in a predetermined position, said apparatus comprising eccentric means including a rotary driving shaft, a cylindrical inertia member disposed around the periphery of said rotary driving shaft and coaxially supported thereon, said inertia member being capable of producing an angular movement relative to said driving shaft and an eccentric shaft rotated by said rotary driving shaft and engaged with said inertia member so as to be moved by the relative angular movement of said inertia member relative to said rotary driving shaft between a co-axial position with the axis of said rotary driving shaft and an eccentric position spaced at a predetermined distance apart therefrom, a movable table engaged through bearing means with said eccentric shaft for supporting the member to be welded, said movable table being connected by motion restricting means to a fixed frame, means for causing a substantial relative circular orbit motion in a plane perpendicular to the axis of said rotary driving shaft, said inertia member being adapted to be angularly moved by rapid increase in the speed of said rotary driving shaft relative thereto from a first position to a second position such that said eccentric shaft is moved from said co-axial position to said eccentric position and said movable table is placed in a relative circular orbit motion, said inertia member being returned by rapid stoppage of said rotary driving shaft from the second position to the first position such that the eccentric shaft is returned to the co-axial position and the movable table is stopped at said predetermined position.

2. A friction welding apparatus as claimed in claim 1 in which the eccentric shaft is engaged with the rotary driving shaft for causing a reciprocating movement in a direction in a plane perpendicular to the axis of the rotary driving shaft, and the eccentric shaft is restrained by a cam surface provided on the inertia member to cause the reciprocating movement between the eccentric and central positions.

3. A friction welding apparatus as claimed in claim 1 in which the centroid of the inertia member is positioned opposite to the axis of the eccentric shaft in respect of the axis of the rotary driving shaft, when the eccentric shaft is eccentrically positioned.

4. A friction welding apparatus as claimed in claim 3 in which the following equation is established $$R = \alpha m r / M$$

wherein R is the distance between the axis of rotation of the inertia member and the centroid of the inertia member, $\alpha$ is a constant ranging $0 < \alpha < 2$, m is the inertial mass of the load during the friction welding operation, r is the radius of eccentricity and M is the mass of the inertia member.

5. A friction welding apparatus as claimed in claim 1 in which the rotatable engagement of the inertia member relative to the rotary driving shaft is made by an arrangement in which the axis of rotation of the inertia member relative to the rotary driving shaft is biased from the axis of the rotary driving shaft.

6. A friction welding apparatus as claimed in claim 5 in which the following equation is established:

$$R = \alpha m r / M$$

wherein R is the distance between the axis of rotation of the inertia member and the axis of rotation of the rotary driving shaft, $\alpha$ is a constant ranging $0 < \alpha < 2$, m is the inertial mass of the load during the friction welding operation, r is the radius of eccentricity and M is the mass of the inertia member.

7. A friction welding apparatus as claimed in claim 5 in which a shaft for the inertia member and a shaft for the eccentric shaft are secured to the rotary driving shaft, the inertia member being rotatably provided on the shaft for the inertia member, the eccentric shaft being rotatably provided on the shaft for the eccentric shaft and a pin of the inertia member being slidably engaged with a groove of the eccentric shaft.

8. A friction welding apparatus as claimed in claim 5 in which the centroid of the inertia member when it is in a position corresponding to the eccentric position of the eccentric shaft is provided within the range of the angle of 0°–180° rearward, in respect of the direction of rotation of the rotary driving shaft, from the plane extending through the axis of rotation of the inertia member and the axis of the rotary driving shaft, such that the centrifugal force of the inertia member acts to stabilize the eccentric position.

9. A friction welding apparatus as claimed in claim 1 or 5 in which two or more connectors spaced each other having axes in parallel with the axis of the rotary driving shaft are secured to one end of the rotary driving shaft, slots engaging with the connectors being formed in the eccentric shaft, a pin of the inertia member being slidably engaged with a groove of the eccentric shaft and the interrelation between the connectors and the slots being set so that the eccentric shaft can be moved between the central and eccentric positions.

10. A friction welding apparatus as claimed in claim 1 or 5 in which a connector engaging the eccentric shaft is pivotally mounted on the rotary driving shaft to be rotatable in a plane extending through the axis of the rotary driving shaft and the connector is engageable with an annular cam circumferentially varying its height and provided on the inertia member.

11. A friction welding apparatus as claimed in claim 1 in which there is provided a driving means on the rotary driving shaft for achieving the rapid acceleration and rapid stoppage of the rotary driving shaft to cause a sufficient force to move the eccentric shaft relative to the rotary driving shaft when acceleration and stoppage of rotation of the rotary driving shaft.

12. A friction welding apparatus as claimed in claim 11 in which the driving means comprises a rotary prime mover, a clutch and a brake.

13. A friction welding apparatus as claimed in claim 1 in which said eccentric means further comprise a click stop mechanism for stabilizing the eccentric means in the co-axial position or in the eccentric position or in both of them.

14. A friction welding apparatus as claimed in claim 13 in which the click stop mechanism is provided between the rotary driving shaft and the eccentric shaft.

15. A friction welding apparatus as claimed in claim 14 in which the click stop mechanism is provided between the eccentric shaft and the inertia member.

16. A friction welding apparatus as claimed in claim 14 in which the click stop mechanism is provided between the rotary driving shaft and the inertia member.

17. A friction welding apparatus as claimed in any of claims 14 to 16 in which the click stop mechanism comprises a follower including a ball or roller, a spring for biasing the follower and a concave portion formed to be engaged with said follower at a position corrsponding to the eccentric and/or co-axial position.

18. A friction welding apparatus as claimed in any of claims 14 to 16 in which the click stop mechanism comprises a leaf spring, a follower in sliding engagement with the leaf spring while deforming the latter, and the stress applied by the follower to the leaf spring to deform the latter becoming minimum at the co-axial and/or eccentric position.

19. A friction welding method comprising placing a pair of members to be welded in such a manner that their surfaces to be welded are contacted under pressure with each other and causing the members to make frictional movements due to a circular orbit motion by the apparatus as claimed in claim 1, thereby welding the members.

20. A friction welding method as claimed in claim 19 in which the minimum width of the surfaces to be welded of said members is larger than the diameter of the circular orbit.

21. A friction welding method for welding a thermoplastic resin material as claimed in claim 20 in which the circulating speed of the circular orbit motion satisfies the following expression:

$$N \geqq 15/D \ (Sec^{-1})$$

wherein N is the circulating cycle of the circular orbit motion and D is the diameter of the circular orbit motion expressed by the unit of centimeter.

* * * * *